(12) United States Patent
Yamamoto et al.

(10) Patent No.: US 11,448,531 B2
(45) Date of Patent: Sep. 20, 2022

(54) SENSOR COMPONENT, SENSOR, AND METHOD FOR MANUFACTURING SENSOR

(71) Applicant: Sumitomo Wiring Systems, Ltd., Mie (JP)

(72) Inventors: Hironobu Yamamoto, Mie (JP); Kyungwoo Kim, Mie (JP); Toshinari Kobayashi, Mie (JP); Masaharu Nakamura, Mie (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 725 days.

(21) Appl. No.: 16/335,895

(22) PCT Filed: Sep. 15, 2017

(86) PCT No.: PCT/JP2017/033520
§ 371 (c)(1),
(2) Date: Mar. 22, 2019

(87) PCT Pub. No.: WO2018/056217
PCT Pub. Date: Mar. 29, 2018

(65) Prior Publication Data
US 2020/0292361 A1 Sep. 17, 2020

(30) Foreign Application Priority Data

Sep. 26, 2016 (JP) .............................. JP2016-186564
Jul. 10, 2017 (JP) .............................. JP2017-134378

(51) Int. Cl.
*G01D 11/24* (2006.01)
*G01P 1/02* (2006.01)
*G01P 3/44* (2006.01)

(52) U.S. Cl.
CPC .............. *G01D 11/245* (2013.01); *G01P 1/02* (2013.01); *G01P 3/44* (2013.01)

(58) Field of Classification Search
CPC ............ G01D 11/245; G01P 1/02; G01P 3/44
(Continued)

(56) References Cited

U.S. PATENT DOCUMENTS 6,590,776 B2    7/2003   Karino et al.
9,244,089 B2    1/2016   Tsuge et al.
(Continued)

FOREIGN PATENT DOCUMENTS

DE            19612765 A1    11/1997
DE         102008010319 A1     8/2008
(Continued)

OTHER PUBLICATIONS

Office Action, German Patent Application No. 11 2017 004 797.8, dated Aug. 30, 2021.
(Continued)

*Primary Examiner* — Nathaniel T Woodward
(74) *Attorney, Agent, or Firm* — Honigman LLP

(57) ABSTRACT

A sensor component includes: a sensor part having a sensor body and a connection terminal extending from the sensor body; and a holder part for holding the sensor part, the connection terminal being resin-sealed by an exterior part that is connected to a conductor of a wire, wherein a melt part that melts during the molding of the exterior part is provided on an outer surface of the holder part that is arranged inside of the exterior part, and the melt part is arranged in a position separating the sensor body and a connection part where the connection terminal is connected to the conductor.

9 Claims, 20 Drawing Sheets

(58) Field of Classification Search
USPC .......................................................... 73/431
See application file for complete search history.

(56) References Cited

U.S. PATENT DOCUMENTS

| | | | |
|---|---|---|---|
| 9,678,096 B2 | 6/2017 | Kobayashi et al. | |
| 2002/0181207 A1* | 12/2002 | Karino | G01P 1/026 361/728 |
| 2004/0150390 A1 | 8/2004 | Tsuge et al. | |
| 2008/0204007 A1 | 8/2008 | Kim et al. | |
| 2009/0078043 A1* | 3/2009 | Tsuda | G01P 1/026 73/431 |
| 2016/0089823 A1 | 3/2016 | Ikeda | |
| 2017/0168080 A1 | 6/2017 | Yamamoto | |

FOREIGN PATENT DOCUMENTS

| | | |
|---|---|---|
| DE | 102014212720 A1 | 1/2015 |
| JP | 2014-130100 A | 7/2014 |
| JP | 5930309 B2 | 6/2016 |

OTHER PUBLICATIONS

International Search Report, Application No. PCT/JP2017/033520, dated Oct. 10, 2017.

\* cited by examiner

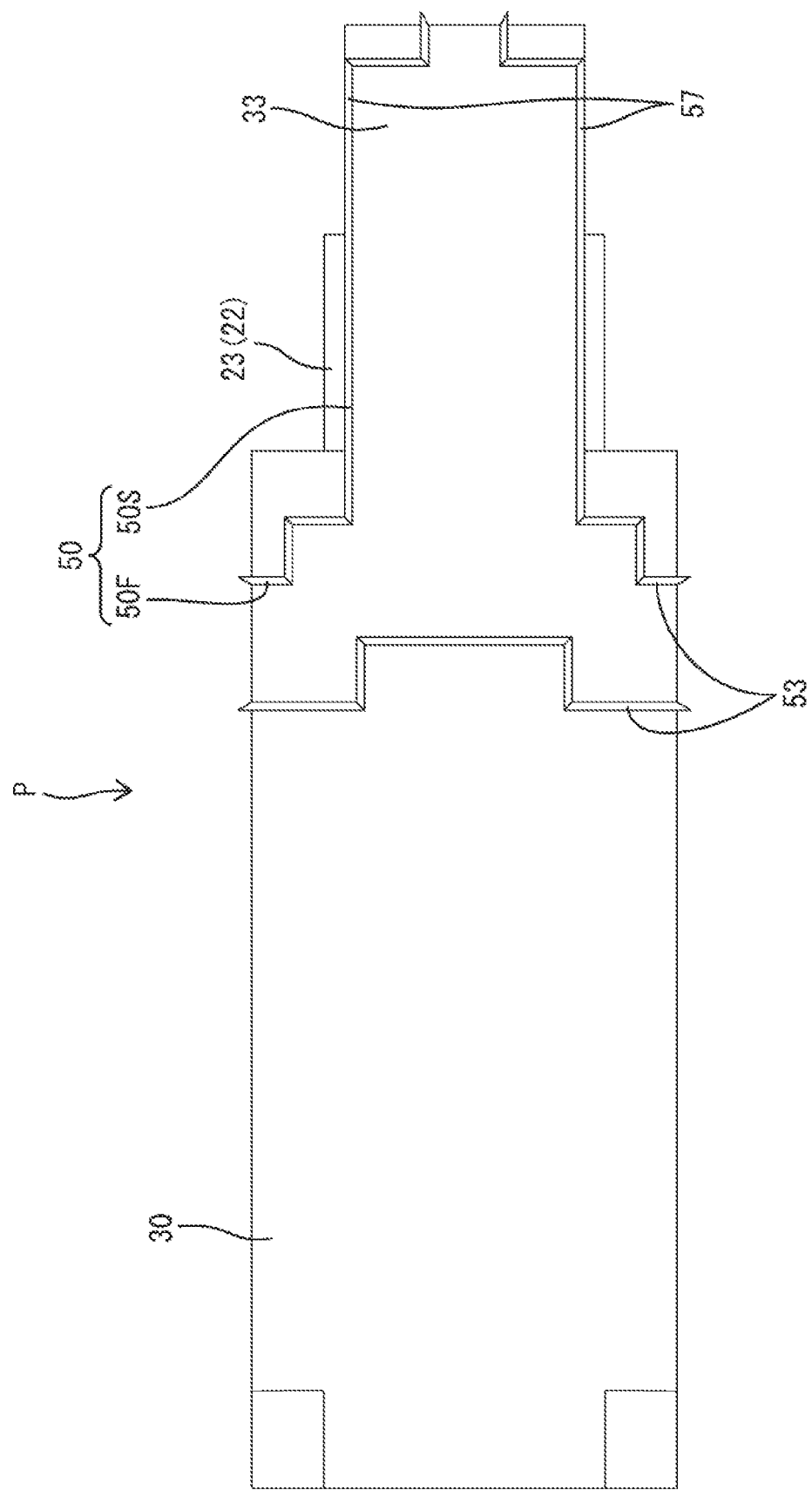

SENSOR COMPONENT, SENSOR, AND METHOD FOR MANUFACTURING SENSOR

CROSS-REFERENCE TO RELATED APPLICATIONS

This application is the U.S. national stage of PCT/JP2017/033520 filed Sep. 15, 2017, which claims priority of Japanese Patent Application No. JP 2016-186564 filed Sep. 26, 2016 and Japanese Patent Application No. JP 2017-134378 filed Jul. 10, 2017, the contents of which are incorporated herein.

TECHNICAL FIELD

The present disclosure relates to a sensor component, a sensor, and a method for manufacturing a sensor.

BACKGROUND

Conventionally, a sensor formed by resin-sealing a sensor component connected to a terminal end of a wire harness by an exterior part is known (as disclosed in JP2014-130100A, for example). The sensor component is formed by a sensor part having a sensor body and a connection terminal extending from the sensor body, being held by a holder part. A conductor of a wire is connected to a part of the connection terminal that is exposed from the holder part. The exterior part is formed by housing, in a mold, the sensor component to which the wire is connected, and then injecting a synthetic resin into the mold and curing the resin.

However, in the configuration described above, there is a risk that a gap will arise at a boundary between the holder part and the exterior part. If there is a gap between the holder part and the exterior part, there is a risk that moisture that reaches the holder part via the conductor of the wire will pass through the gap between the holder part and the exterior part and reach the sensor body, and a failure in the sensor part will be caused.

The present disclosure has been made in view of the above-described circumstances, and an object of the present disclosure is to provide a sensor component, a sensor, and a method for manufacturing a sensor, according to which moisture that reaches a holder part via a conductor of a wire can be prevented from penetrating toward a sensor body.

SUMMARY

A sensor component according to the present disclosure includes: a sensor part having a sensor body and a connection terminal extending from the sensor body, and a holder part for holding the sensor part, the connection terminal being resin-sealed by an exterior part in a state in which the connection terminal is connected to a conductor of a wire; and a melt part that melts during the molding of the exterior part is provided on an outer surface of the holder part that is arranged inside of the exterior part, and the melt part is arranged at a position separating the sensor body and a connection part where the connection terminal is connected to the conductor.

A sensor according to the present disclosure includes: the sensor component, and an exterior part that resin-seals the sensor component, and the melt part is melted and adhered to the exterior part.

A method for manufacturing the sensor according to the present disclosure is a method for manufacturing the above-described sensor, the method including: a sensor component manufacturing step of manufacturing the sensor component by holding the sensor part with the holder part; a wire connecting step of connecting the wire to the connection terminal of the sensor component; and a resin-sealing step of resin-sealing the sensor component by the exterior part, and in the resin-sealing step, the melt part is melted and adhered to the exterior part.

Advantageous Effects of Disclosure

According to the present disclosure, the melt part is adhered to the exterior part at a position between the sensor body and the connection part of the connection terminal, and thus moisture that reaches the holder part via the conductor of the wire can be prevented from penetrating toward the sensor body.

BRIEF DESCRIPTION OF DRAWINGS

FIG. 20 is a bottom view showing the sensor component.

DETAILED DESCRIPTION OF PREFERRED EMBODIMENTS

Hereinafter, preferred embodiments of the present disclosure will be described.

The melt part of the sensor component of the present disclosure may be provided at a position separating the adjacent connection parts of an outer surface of the holder part. With this configuration, the melt part is adhered to the exterior part at the position of the outer surface of the holder part between the adjacent connection parts. Accordingly, it is possible to prevent moisture that reaches the holder part via the conductor of the wire from penetrating into the adjacent connection parts, and to prevent a short circuit between the connection parts.

Also, the melt part of the sensor component of the present disclosure may be a rib protruding from the outer surface of the holder part, and the protruding end of the rib may be pointed. With this configuration, the leading end of the melt part readily melts during the molding of the exterior part, and the melt part can be reliably adhered to the exterior part.

Also, the connection terminal of the sensor component of the present disclosure may be coated with a moisture-proofing agent. With this configuration, even if moisture reaches the connection terminal, the connection terminal is not directly exposed to the moisture, and thus a short circuit between the connection terminals can be prevented.

Embodiment 1

Hereinafter, Embodiment 1 in which the present disclosure is embodied will be described in detail with reference to FIGS. 1 to 13.

Figure 2:
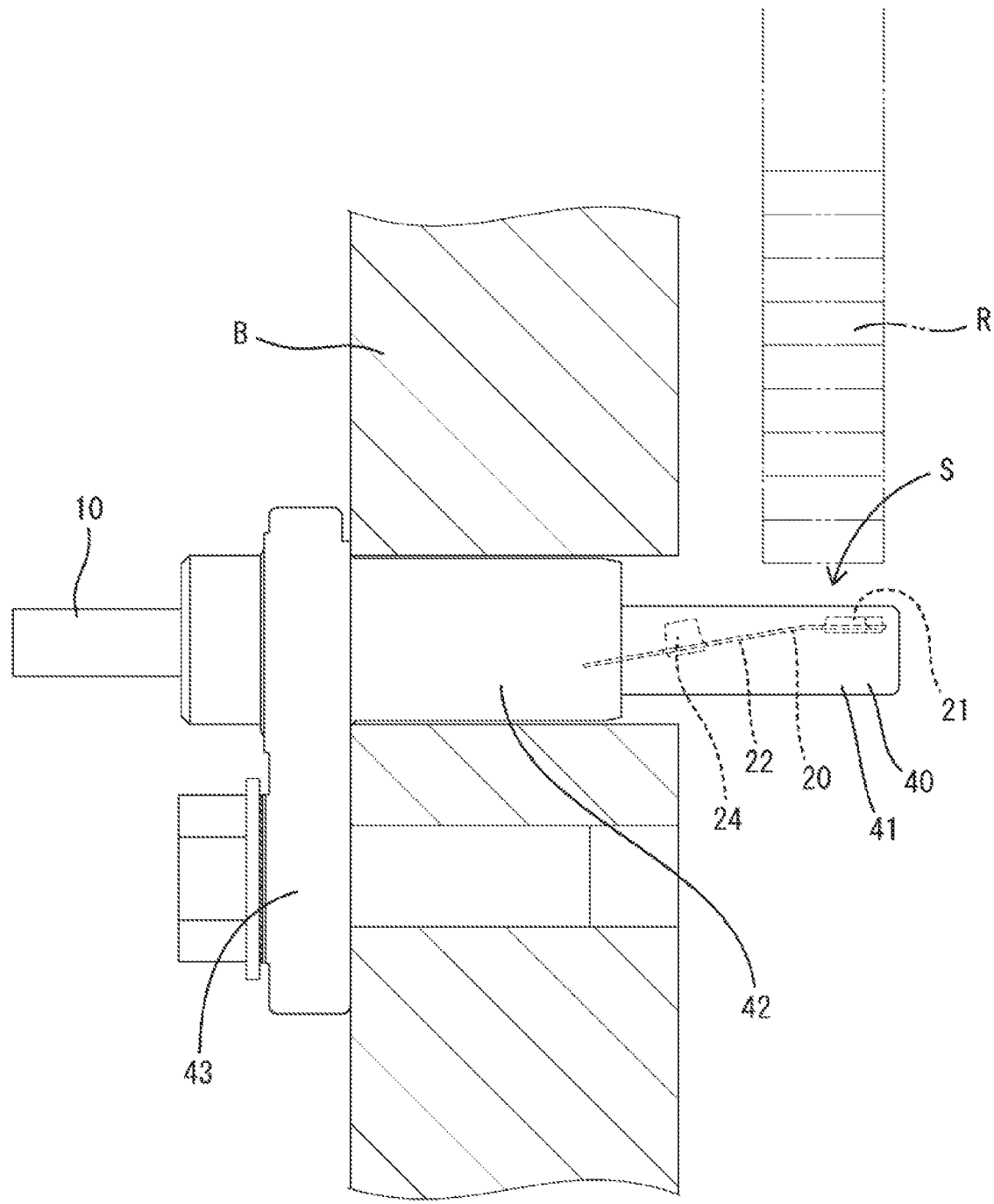
FIG. 2 is a cross-sectional view showing the positional relationship between the sensor and a rotor that is fixed to a vehicle body.
Figure 3:
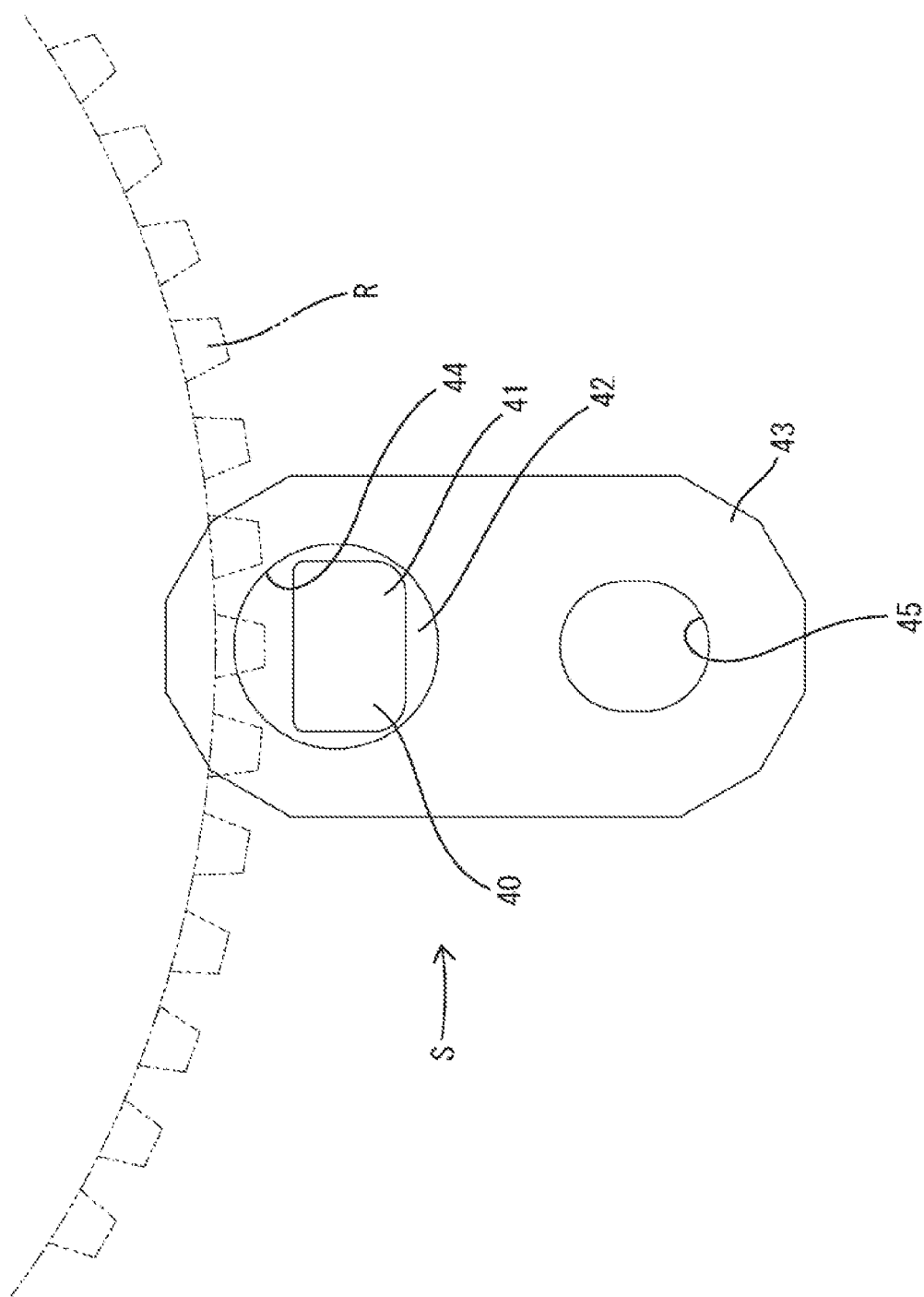
FIG. 3 is a schematic view showing the positional relationship between the rotor and the sensor.

A sensor according to this embodiment is a vehicle sensor to be attached to a vehicle, particularly, a wheel speed sensor S used for measuring the speed of a wheel. As shown in FIG. 2, the wheel speed sensor S is fixed to a fixed part B of the vehicle, facing a rotor R that rotates along with the wheel of the vehicle. The wheel speed sensor S includes a wire harness 10 connected to a control device or the like mounted in the vehicle. The control device of the vehicle can calculate the wheel speed of the vehicle in accordance with output signals from the wheel speed sensor S, and can use the calculated wheel speed for controlling the ABS (anti-lock brake system) or the like.

Figure 1:
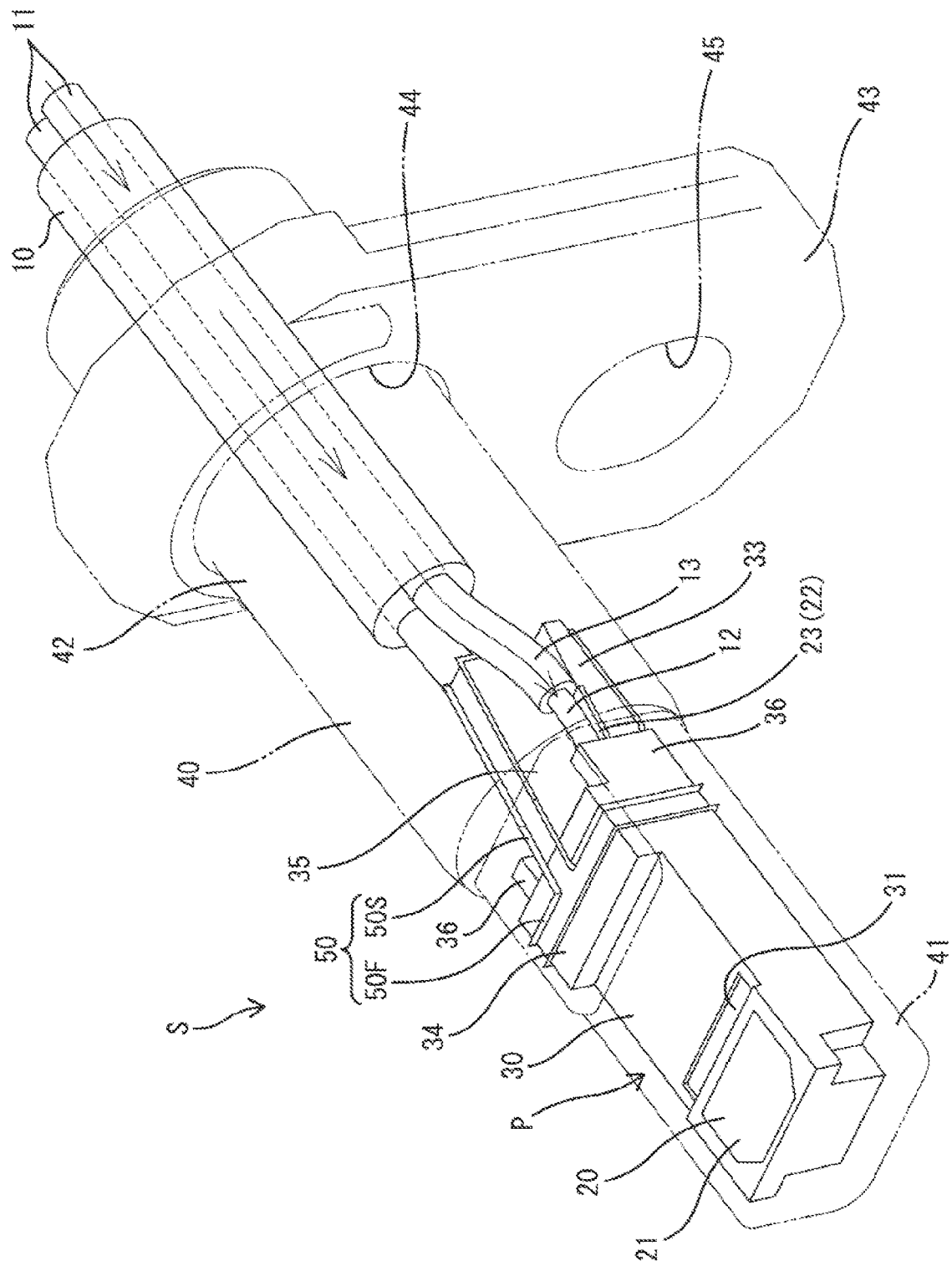
FIG. 1 is a perspective view showing a sensor according to Embodiment 1.

As shown in FIG. 1, the wire harness 10 is formed by covering two wires 11 together with resin coating or the like to form a single wire. The wires 11 are each formed by a conductor 12 being covered with an insulating coating 13, in which the insulating coating 13 is removed at the terminal portion and the exposed conductor 12 is electrically connected to a connection terminal 22 of a sensor part 20.

Figure 6:
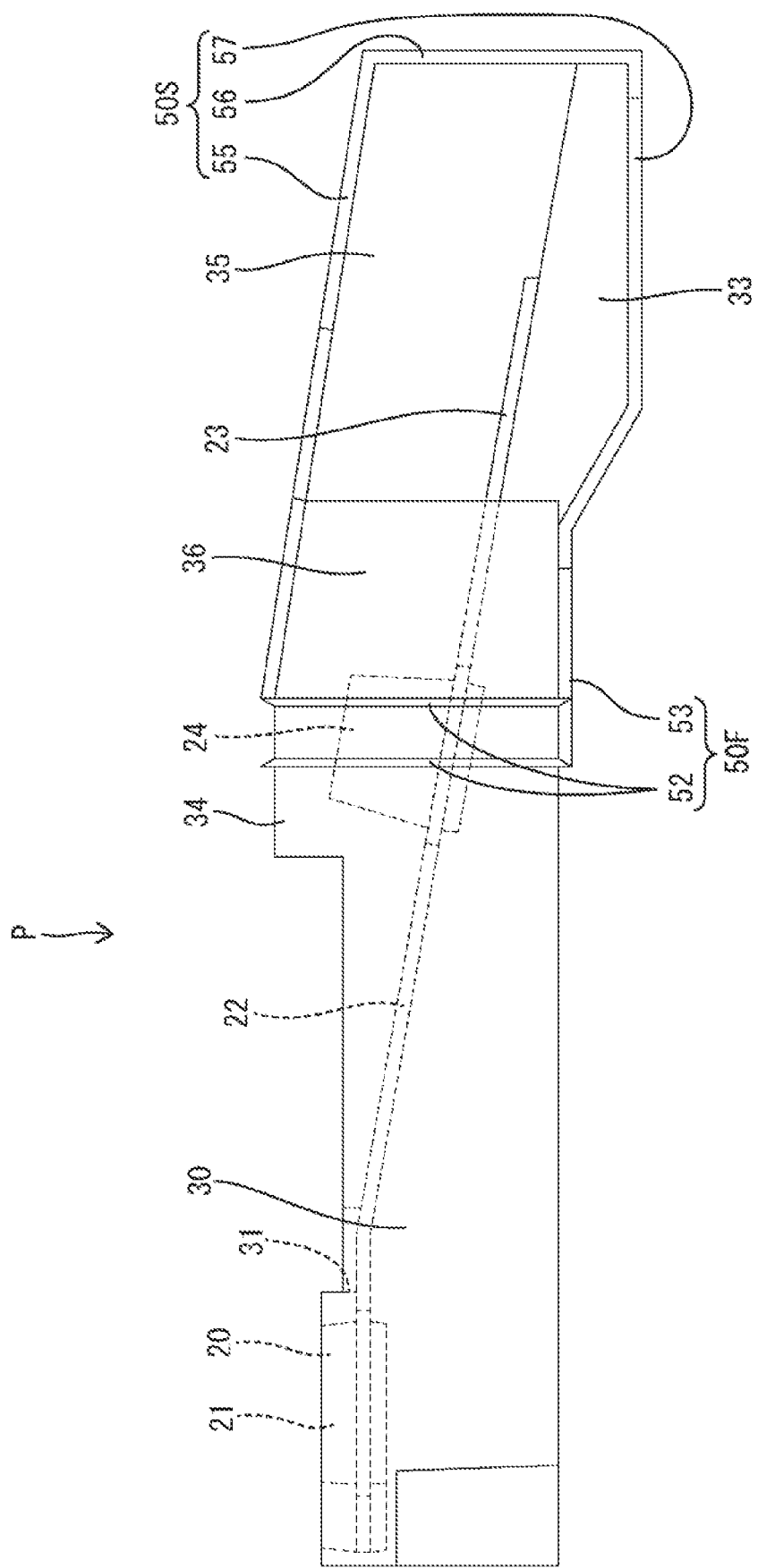
FIG. 6 is a side view showing the sensor component.

The wheel speed sensor S is formed by resin-sealing a sensor component P connected to the wire harness 10 by an exterior part 40. As shown in FIG. 6, the sensor component P includes a sensor part 20 having a sensor body 21 and the connection terminals 22 extending from the sensor body 21, and a holder part 30 for holding the sensor part 20. The sensor component P is an insert-molded product obtained by insert-molding (primary molding) the holder part 30 with the sensor part 20 serving as the insert. The wheel speed sensor S is an insert-molded product obtained by insert-molding (secondary molding) the exterior part 40 with the sensor component P, to which the wire harness 10 is connected, serving as the insert.

Hereinafter, in the description of the constituent elements, "rear" refers to the direction (left in FIG. 2) in which the wire harness 10 extends out from the exterior part 40, "front" refers to the opposite side (right in FIG. 2) of the rear, "upper" refers to the upside in FIG. 2, and "lower" refers to the downside in FIG. 2.

The sensor part 20 includes the sensor body 21 including a detection element (not shown) that converts a physical amount to be detected into an electrical amount or the like, and the connection terminals 22 extending from the sensor body 21.

The sensor body 21 is formed by sealing a detection circuit including the detection element with molding resin material so that it is liquid-tight, and has a plate shape as a whole. As shown in FIG. 6, the sensor body 21 is embedded in the front-end portion of the holder part 30 with the plate-thickness direction as its up-down direction, and the upper surface of the sensor body 21 is exposed from the upper surface of the holder part 30. In a state where the wheel speed sensor S is fixed to the vehicle, the upper surface of the sensor body 21 is arranged facing the outer periphery of a rotor R (see FIG. 2). Note that the sensor part 20 of this embodiment is configured as a Hall IC that accommodates a signal conversion circuit and a Hall element serving as a magnetoelectric conversion element, and that converts changes of a magnetic field into electrical signals and outputs the electrical signals from the connection terminals 22.

Figure 5:
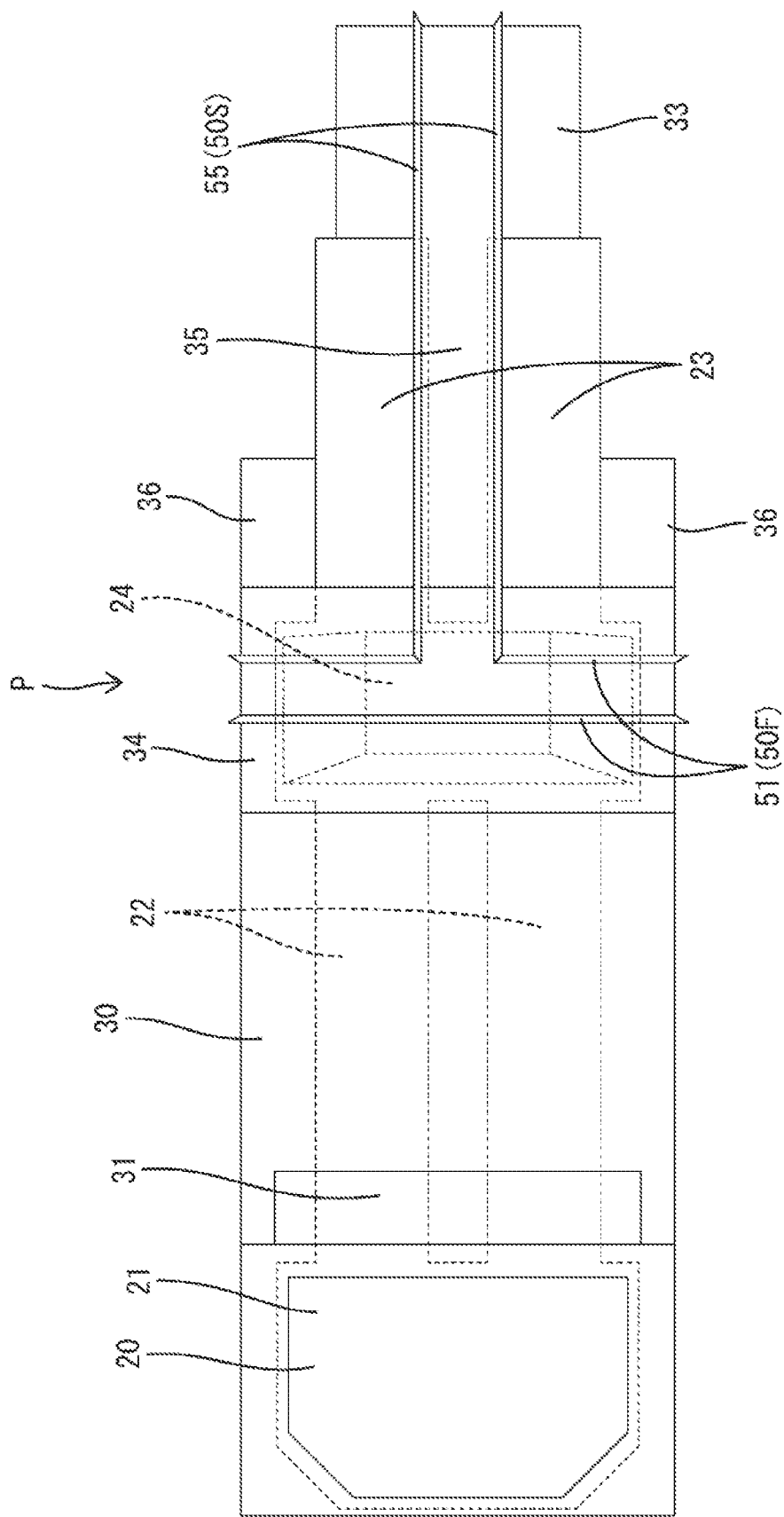
FIG. 5 is a plan view showing the sensor component.

As shown in FIGS. 5 and 6, the connection terminals 22 have an elongated rectangular plate shape, and extend in one direction from the sensor body 21. Plating such as tin is applied to the outer surface of the connection terminals 22. The sensor part 20 includes a pair of connection terminals 22, and the pair of connection terminals 22 protrude from the sensor body 21 substantially in parallel, and bend obliquely downward.

Figure 12:
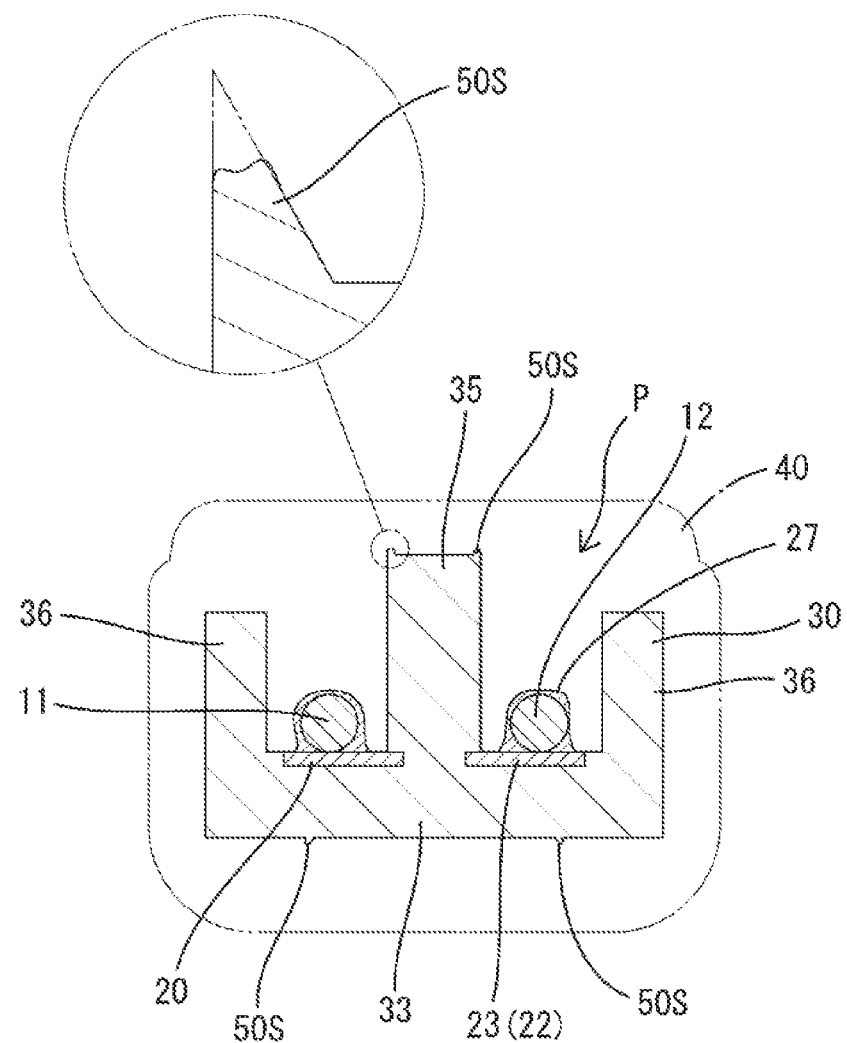
FIG. 12 is a cross-sectional view showing a state where a melt part is melted, and a view corresponding to a cross-section taken along A-A in FIG. 11.
Figure 13:
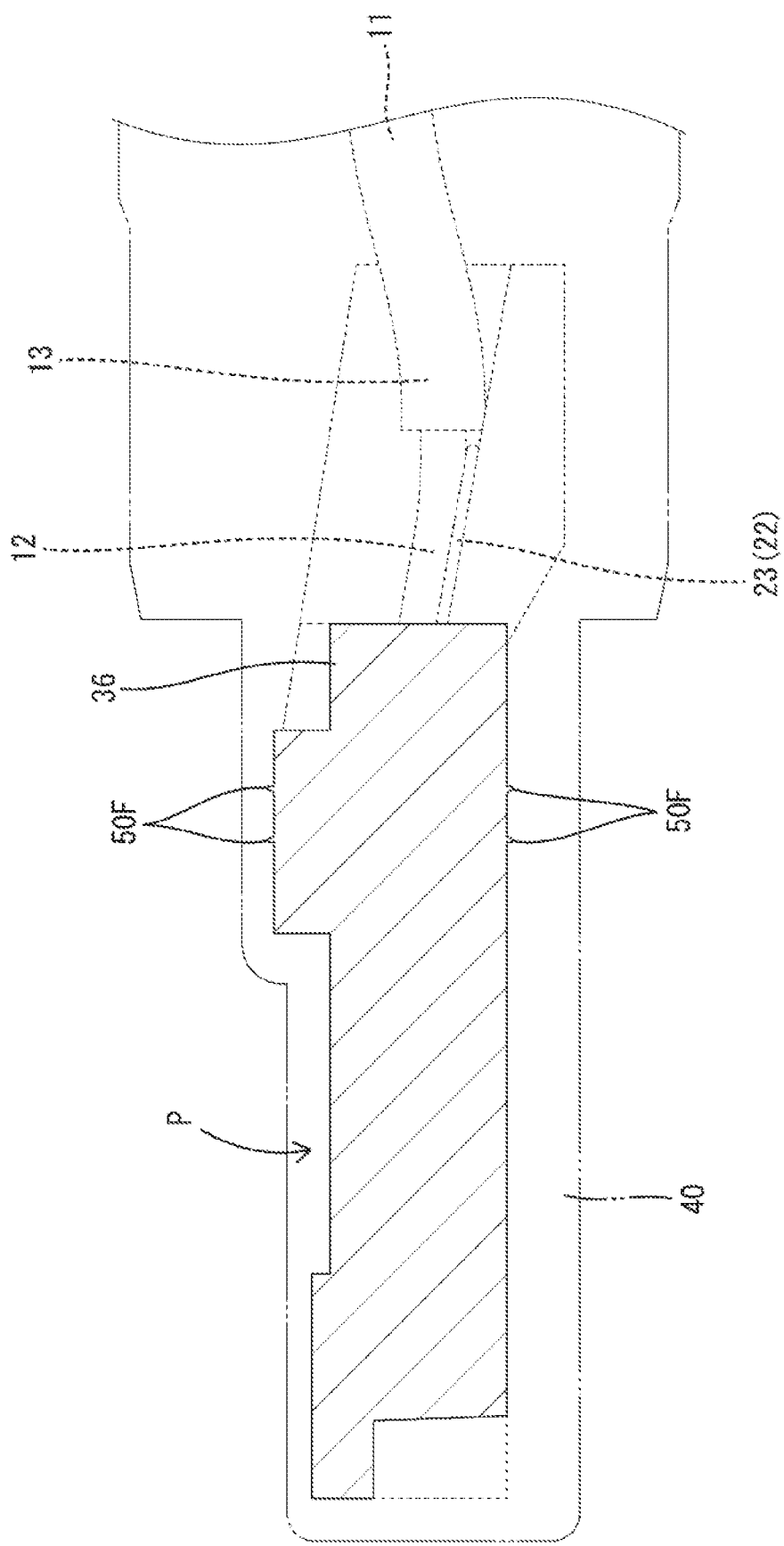
FIG. 13 is a cross-sectional view of the sensor showing a state where the melt part is melted, and a view corresponding to a cross-section taken along B-B in FIG. 11.

A capacitor 24 is connected to one side (upper surfaces) of the pair of connection terminals 22. The extending end portions (rear end portions) of the connection terminals 22 are connection parts 23 to which conductors 12 of the wires 11 are connected. As shown in FIG. 12, the conductors 12 of the wires 11 are electrically connected to the upper sides of the connection terminals 22 with use of solder 27.

Figure 4:
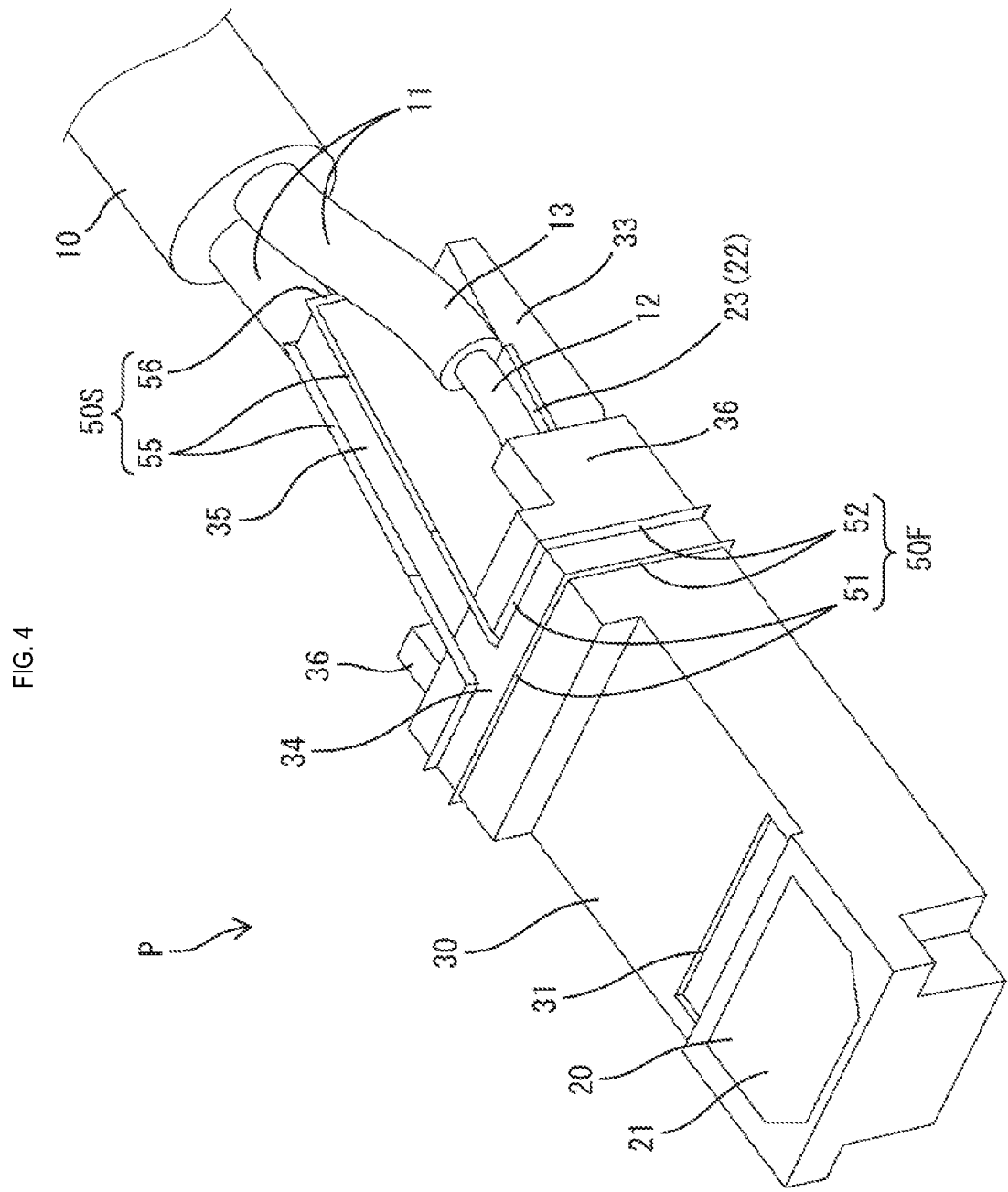
FIG. 4 is a perspective view showing a sensor component that is connected to wires.

As shown in FIG. 4, the front end portions (portions located near the rear of the sensor body 21) and the connection parts 23 of the connection terminals 22 are exposed on the upper surface of the holder part 30. The exposed portions at the front end portions of the connection terminals 22 are located at the bottom of a recess 31 that is formed somewhat lower than the upper surface of the sensor body 21.

A moisture-proofing agent (not shown) is applied to the connection terminals 22. The moisture-proofing agent is applied to the exposed portions at the front end portions of the connection terminals 22. The moisture-proofing agent is applied to the recess 31 to coat the exposed portions of the connection terminals 22. Accordingly, even if moisture penetrates near the sensor body 21, a short circuit of the connection terminals 22 can be prevented.

The connection parts 23 of the connection terminals 22 are placed on the upper surface of the placement part 33 formed in the rear portion of the later-described holder part 30.

The holder part 30 is, for example, made of a synthetic resin such as nylon resin, and is formed in one piece with the sensor part 20. The holder part 30 is elongate in a front-rear direction as a whole.

The holder part 30 includes the placement part 33 that holds the connection parts 23 of the connection terminals 22 on the upper side. The placement part 33 has a plate shape formed along the lower surface of the holder part 30. As shown in FIG. 6, the upper surface of the placement part 33 gradually inclines downward toward the rear end, and the rear portion of the lower surface of the placement part 33 has a stepped part that is formed somewhat lower than the front portion. The width of the placement part 33 is narrower than the front portion of the holder part 30, and the connection parts 23 partly protrude toward two opposite sides in the width direction.

The holder part 30 includes a first partition wall 34 that separates the sensor body 21 and the connection parts 23. The first partition wall 34 stands in front of the placement part 33, and its wall surface is substantially vertical. The first partition wall 34 is provided over the entire width of the holder part 30. The capacitor 24 is embedded in the first partition wall 34.

The holder part 30 includes a second partition wall 35 that separates the adjacent connection parts 23. The second partition wall 35 stands between the adjacent connection parts 23, and the wall surface substantially forms a right angle. The second partition wall 35 stands upright on the upper surface of the placement part 33, divides the placement part 33 in the width direction, and spans from the first partition wall 34 to the rear end of the holder part 30. The second partition wall 35 is provided in the center in the width direction of the placement part 33, and is substantially perpendicular to the first partition wall 34 in a plan view. The thickness (dimension in the width direction of the holder part 30) of the second partition wall 35 is smaller than that of the first partition wall 34.

As shown in FIG. 6, the upper surface of the second partition wall 35 gradually inclines downward toward the rear end. The degree of incline of the upper surface of the second partition wall 35 is similar to that of the upper surface of the placement part 33, and the height of the second partition wall 35 is substantially constant in the front-rear direction.

The holder part 30 includes a pair of side walls 36 that stand upright on the two sides in the width direction of the placement part 33. The pair of side walls 36 is provided on the front end portion of the placement part 33, and they are continuous with the rear side of the first partition wall 34. The pair of side walls 36 is somewhat lower than the first partition wall 34.

A melt part 50 is provided on the outer surface of the holder part 30. The melt part 50 will be described in detail later.

The exterior part 40 is made of the same kind of synthetic resin as the holder part 30, which enables good fusion between the exterior part 40 and the holder part 30. As shown in FIG. 1, the exterior part 40 as a whole has an elongated rod shape in the direction in which the wire harness 10 extends, and covers the entire part from the terminal portion of the wire harness 10 to the front end of the sensor component P.

The front portion of the exterior part 40 (hereinafter referred to as "exterior front portion 41") has a quadrangular prism shape, and the rear portion (hereinafter referred to as an exterior rear portion 42) has a circular cylindrical shape. Most of the holder part 30 is embedded in the exterior front portion 41. The placement part 33 of the holder part 30 and the terminal portion of the wire harness 10 are embedded in the exterior rear portion 42. Also, the exterior rear portion 42 is fixed by being inserted into an insertion hole 44 of a bracket 43 that is to be fixed to the vehicle.

The bracket 43 is a substantially oval plate having the insertion hole 44 formed in the one end portion in the longitudinal direction, and a fixing hole 45 for fixing the bracket 43 to the vehicle is formed in the other end portion. Both the insertion hole 44 and the fixing hole 45 are substantially circular, and penetrate the bracket 43 in the front-rear direction (plate-thickness direction). At the insertion hole 44, the bracket 43 constitutes one piece with the exterior rear portion 42 that is inserted into the insertion hole 44. The wheel speed sensor S is fixed to a suitable location of the vehicle using the fixing hole 45 of the bracket 43 by a method such as screwing.

The outer surface of the holder part 30 is provided with the melt part 50 that is melted and adhered to the exterior part 40 during the molding of the exterior part 40. The melt part 50 is a rib protruding from the outer surface of the holder part 30, and has a triangular cross-section which is pointed at the protruding end.

As shown in FIG. 5, the melt part 50 includes first melt parts 50F that partition the connection parts 23 from the sensor body 21, and second melt parts 50S that partition the adjacent connection parts 23.

The first melt parts 50F are provided at a location along the front-rear direction of the holder part 30, and extend in the direction that is substantially orthogonal to the front-rear direction. The first melt parts 50F as a whole are provided so as to continuously surround the whole periphery of the holder part 30. A plurality (in this embodiment, two) of first melt parts 50F are provided on the penetration path of moisture in the front-rear direction.

The first melt parts 50F each include first upper surface melt parts 51 provided on the upper surface of the holder part 30, first side surface melt parts 52 provided on the left and right side surfaces of the holder part 30, and first lower surface melt parts 53 provided on the lower surface of the holder part 30. A pair of the first upper surface melt parts 51, a pair of the first side surface melt parts 52, and a pair of the first lower surface melt parts 53 are each formed substantially parallel to each other in the front-rear direction.

As shown in FIG. 5, the first upper surface melt parts 51 are provided on the upper surface of the first partition wall 34. The first upper surface melt part 51 on the rear side out of the front-rear pair of first upper surface melt parts 51 is continuous with later-described second upper surface melt parts 55.

As shown in FIG. 6, the first side surface melt parts 52 each extend substantially vertically downward on the side surface of the holder part 30 from the two ends in the width direction of the first upper surface melt parts 51 to the lower surface of the holder part 30.

Figure 7:
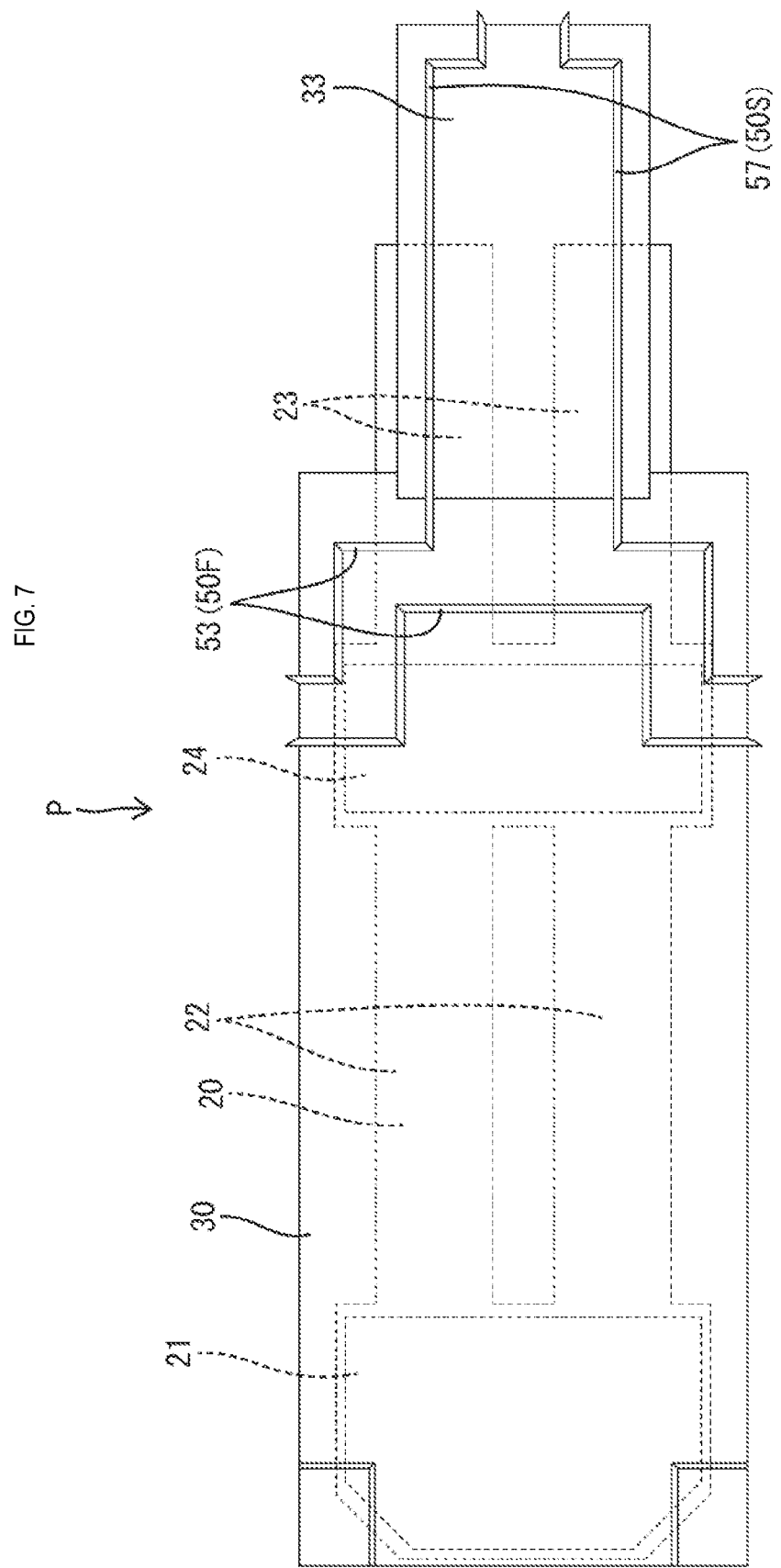
FIG. 7 is a bottom view showing the sensor component.
Figure 8:
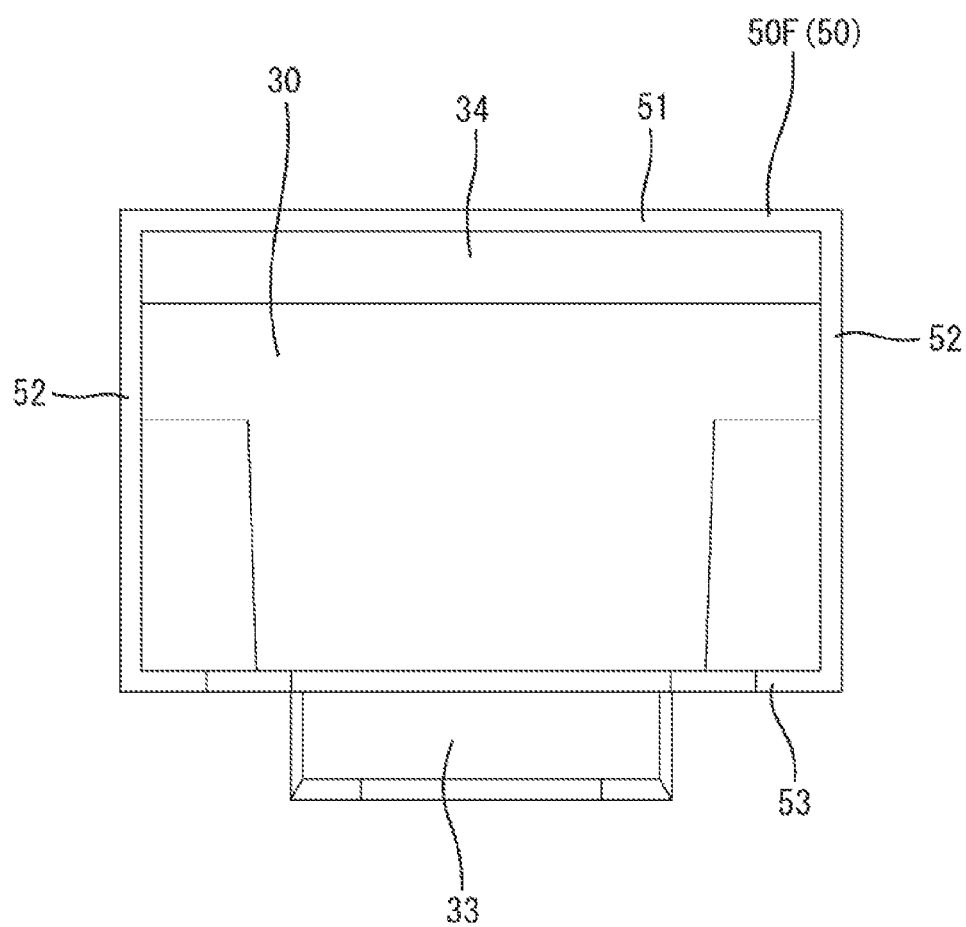
FIG. 8 is a front view showing the sensor component.

As shown in FIG. 7, the first lower surface melt parts 53 extend across the lower surface of the holder part 30 and are continuous with the lower ends of the first side surface melt parts 52. The middle portions of the first lower surface melt parts 53 are shifted rearward somewhat so as to circumvent the part in which the capacitor 24 is embedded. The first lower surface melt part 53 on the rear side out of the front-rear pair of first lower surface melt parts 53 is continuous with a later-described second lower surface melt part 57.

The second melt parts 50S are provided on the rear portion of the holder part 30 and extend in the front-rear direction. The second melt parts 50S are provided so as to surround continuously the whole portion located between the adjacent connection parts 23. A plurality (in this embodiment, two) of second melt parts 50S are provided on the penetrating path of moisture in the left-right direction (the width direction of the holder part 30).

The second melt parts 50S each include second upper surface melt parts 55 provided on the upper surface of the holder part 30, second rear surface melt parts 56 provided on the rear surface, and second lower surface melt parts 57 provided on the lower surface. A pair of second upper surface melt parts 55, a pair of second rear surface melt parts 56, and a pair of second lower surface melt parts 57 are each formed to be substantially parallel to each other in the left-right direction.

As shown in FIG. 5, the second upper surface melt parts 55 are provided on the upper surface of the second partition wall 35. The second upper surface melt parts 55 extend in the front-rear direction along the left and right edges of the second partition wall 35.

The front end of each of the second upper surface melt parts 55 is continuous with the first upper surface melt part 51. The second upper surface melt part 55 and the first upper surface melt part 51 are substantially orthogonal to each other, and the first upper surface melt part 51 is interrupted at a portion where the first upper surface melt part 51 is continuous with the second upper surface melt part 55 (a portion located between the left-right pair of second upper surface melt parts 55).

Figure 9:
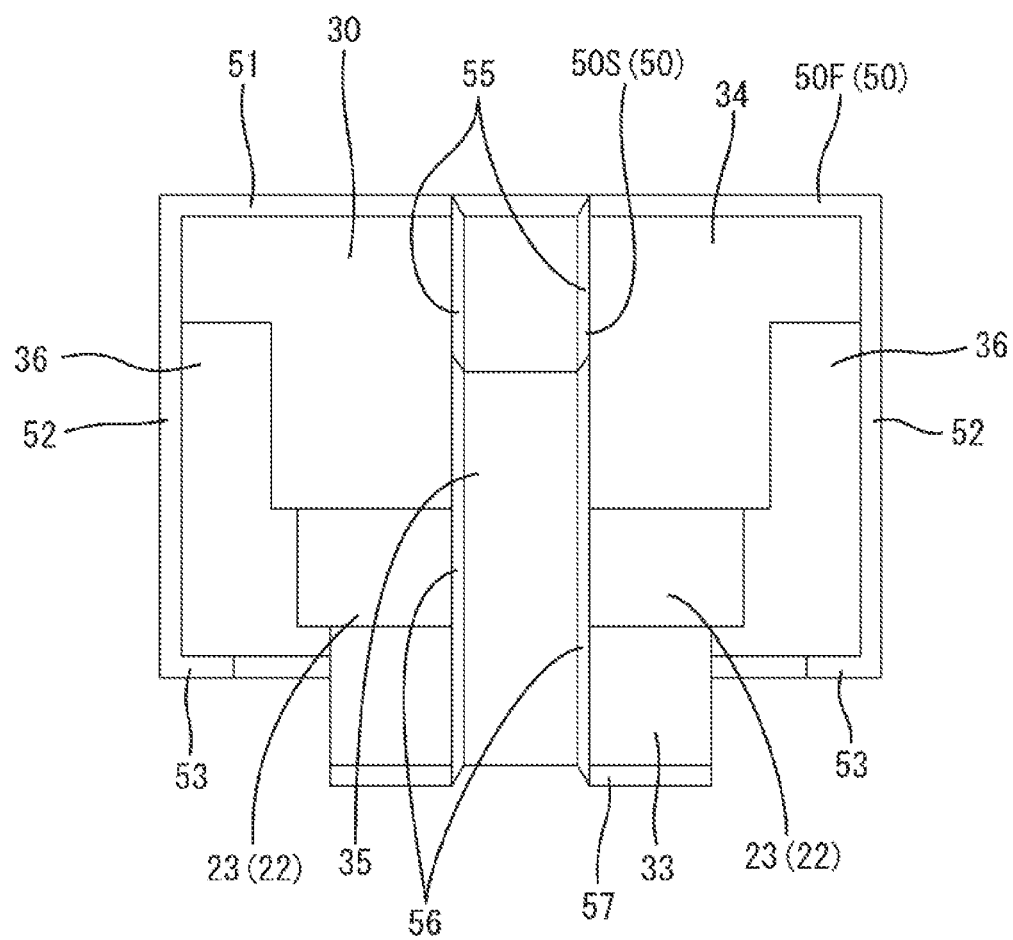
FIG. 9 is a rear view showing the sensor component.
Figure 10:
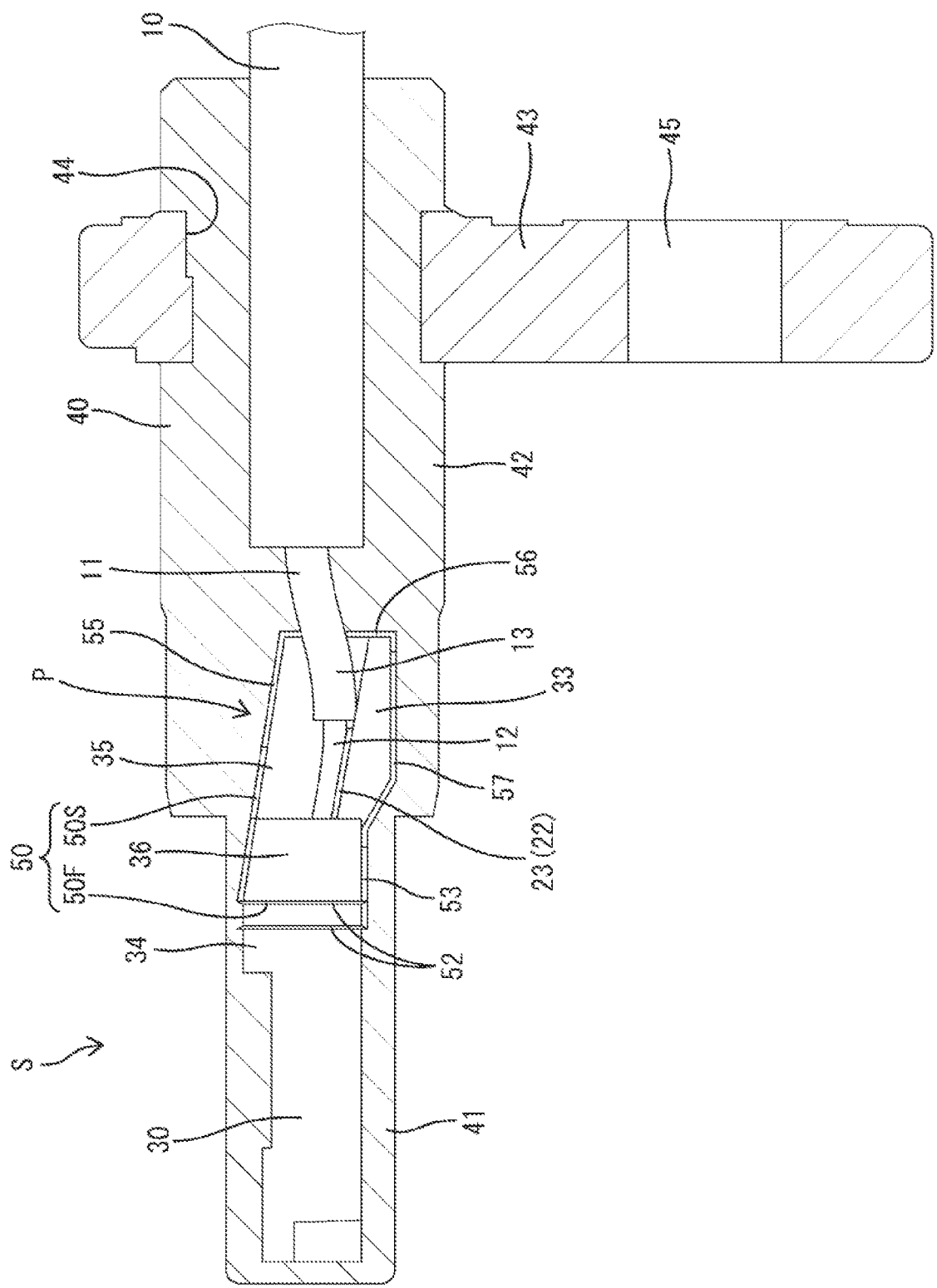
FIG. 10 is a side cross-sectional view showing a state where the sensor component is resin-sealed by an exterior part.
Figure 11:
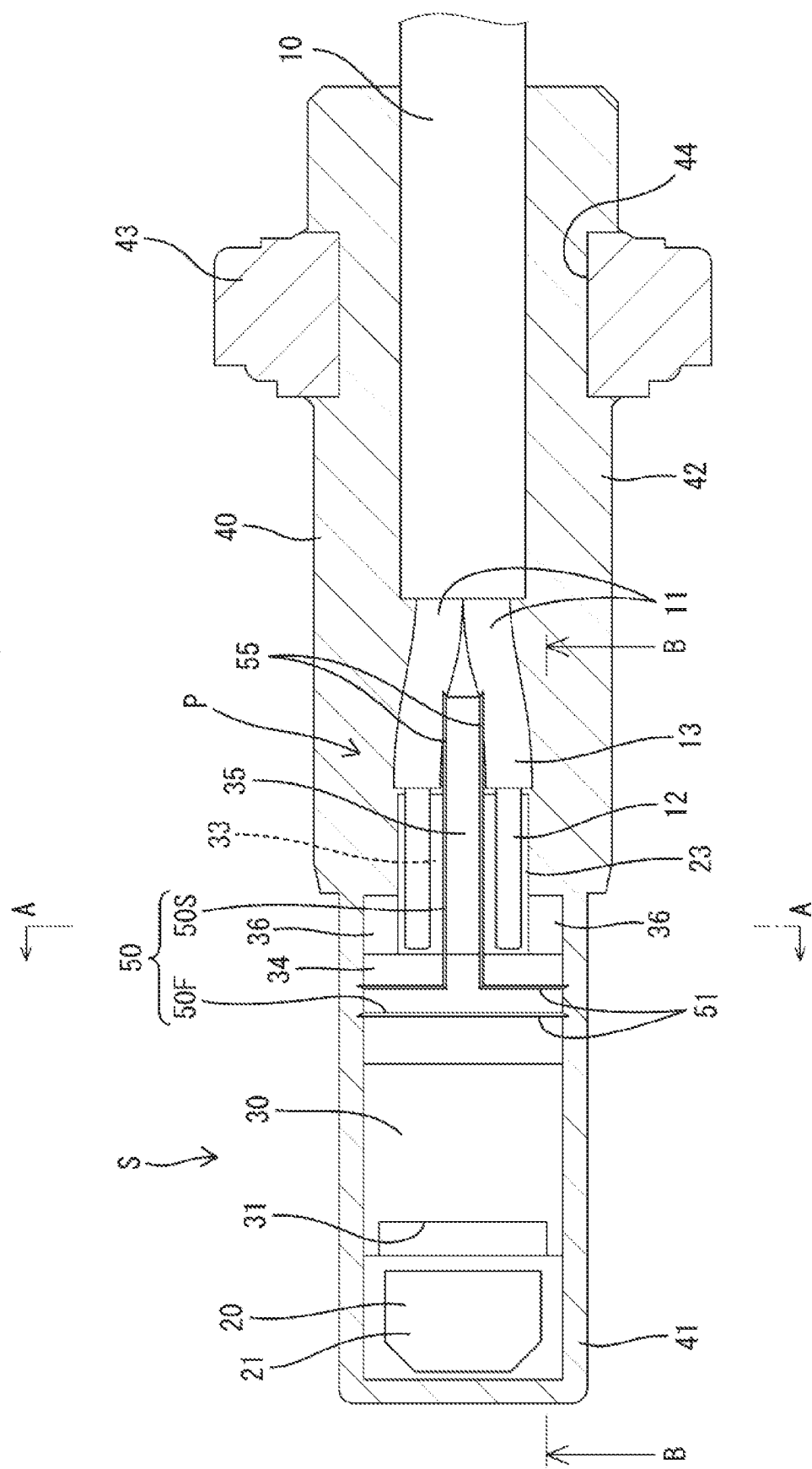
FIG. 11 is a plan cross-sectional view showing a state where the sensor component is resin-sealed by the exterior part.

As shown in FIG. 6, the second rear surface melt parts 56 extend downward substantially vertically on the rear surface of the holder part 30 from the rear end of the second upper surface melt parts 55 to the lower surface of the holder part 30. As shown in FIG. 9, the second rear surface melt parts 56 are formed along the edges on the left and right sides of the rear surface of the second partition wall 35.

As shown in FIG. 7, the second lower surface melt parts 57 extend frontward on the lower surface of the holder part 30 and are continuous with the lower end of the second rear surface melt parts 56. Most of the second lower surface melt parts 57 is shifted outward somewhat with respect to the rear end portion.

The front end of each of the second lower surface melt parts 57 is continuous with the first lower surface melt part 53. The second lower surface melt part 57 and the first lower surface melt part 53 are substantially orthogonal to each other, and the first lower surface melt part 53 is interrupted at a portion where the first lower surface melt part 53 is continuous with the second lower surface melt part 57 (a portion located between the left-right pair of second lower surface melt parts 57).

Next, an example of a method for manufacturing the wheel speed sensor S according to this embodiment will be described. The method for manufacturing the wheel speed sensor S includes: a sensor component manufacturing step of manufacturing a sensor component P by holding the sensor part 20 with the holder part 30; a wire connecting step of connecting wires 11 to connection terminals 22 of the sensor component P; and a resin-sealing step of resin-sealing the sensor component P by an exterior part 40.

First, the sensor component manufacturing step is performed. In the sensor component manufacturing step, the sensor part 20 is positioned and accommodated in a mold for primary molding. Thereafter a synthetic resin is injected into the mold and cured to mold the holder part 30. Accordingly, a sensor component P in which the sensor part 20 is embedded in the holder part 30 in one piece is manufactured.

Next, the wire connecting step is performed. In the wire connecting step, conductors 12 of the wires 11 of a wire harness 10 are connected to the connection terminals 22 of the sensor component P by a method such as soldering.

Next, the resin-sealing step is performed. In the resin-sealing step, the sensor component P, the terminal of the wire harness 10, and the bracket 43 are positioned and accommodated in a mold for secondary molding in a state where the terminal of the wire harness 10 is inserted into an insertion hole 44 of the bracket 43. Thereafter a synthetic resin is injected into the mold and cured, thereby molding the exterior part 40. The formed exterior rear portion 42 adheres to the peripheral surface of the insertion hole 44 of the bracket 43 in one piece. Thereby the bracket 43 and the exterior part 40 are formed together in one piece.

Also, in the resin-sealing step, the melt part 50 is melted and adhered to the exterior part 40. As shown in the enlarged view in FIG. 12, the leading end portion of the melt part is melted and adhered to the exterior part. By the first melt parts 50F being melted and adhered to the exterior part 40, a moisture penetration path spanning from the connection parts 23 to the sensor body 21 is completely blocked by the contact area between the holder part 30 and the exterior part 40. By the second melt parts 50S being melted and adhered to the exterior part 40, a moisture penetration path spanning the adjacent connection parts 23 is completely blocked by the contact area between the holder part 30 and the exterior part 40.

Hereinafter, the action and effect of this embodiment with the above-described configuration will be described.

The wheel speed sensor S according to this embodiment is provided with a sensor component P including: the sensor part 20 having the sensor body 21 and the connection terminals 22 extending from the sensor body 21, and the holder part 30 for holding the sensor part 20. The sensor component P is formed by the connection terminals 22 being resin-sealed by the exterior part 40 in which they are connected to the conductors 12 of the wires 11, in which the melt part 50 that melts during the molding of the exterior part 40 is provided at a position of the outer surface of the holder part 30 that separates the connection parts 23 and the sensor body 21.

With this configuration, the melt part 50 adheres to the exterior part 40 at a position between the connection parts 23 of the connection terminals 22 and the sensor body 21, and thus moisture that reaches the holder part 30 via the conductor 12 of the wires 11 can be prevented from penetrating toward the sensor body 21.

Also, the melt part 50 is provided at the position separating the adjacent connection parts 23 of the outer surface of the holder part 30. With this configuration, since the melt part 50 adheres to the exterior part 40 at the position between the adjacent connection parts 23, of the outer surface of the holder part 30, moisture that reaches the holder part 30 via the conductors 12 of the wires 11 can be prevented from penetrating into the connection parts 23, and thus a short circuit between the connection parts 23 can be prevented.

Furthermore, the melt part 50 is a rib protruding from the outer surface of the holder part 30 and the protruding end of the rib is pointed. With this configuration, the leading end of the melt part 50 readily melts during the molding of the exterior part 40, and thus the melt part 50 can be reliably adhered to the exterior part 40.

Embodiment 2

Hereinafter, the sensor S according to Embodiment 2 in which the present disclosure is embodied will be described with reference to FIGS. 14 to 17.

The sensor S according to this embodiment is different from Embodiment 1 in that the moisture-proofing agent is applied to the connection terminals 22 before the sensor part 20 is held with the holder part 30. Note that structures that are the same as in Embodiment 1 are given the same reference signs, and redundant description will be omitted.

Similarly to Embodiment 1, the sensor S according to this embodiment is provided with a sensor component P that includes: a sensor part 20 having a sensor body 21 and connection terminals 22 extending from the sensor body 21; a holder part 30 for holding the sensor part 20; and an exterior part 40 that resin-seals the sensor component P. Similarly to Embodiment 1, the sensor S is provided with a melt part 50 that melt during the molding of the exterior part 40, on the outer surface of the holder part 30.

Figure 16:
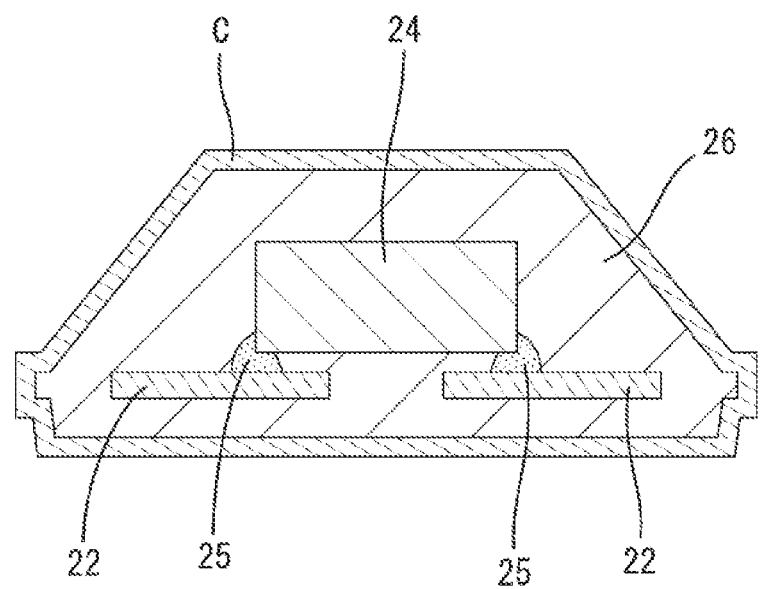
FIG. 16 is a cross-sectional view showing the sensor component in a state where the coating layer is formed thereon, and a view corresponding to a cross-section taken along D-D in FIG. 14.
Figure 17:
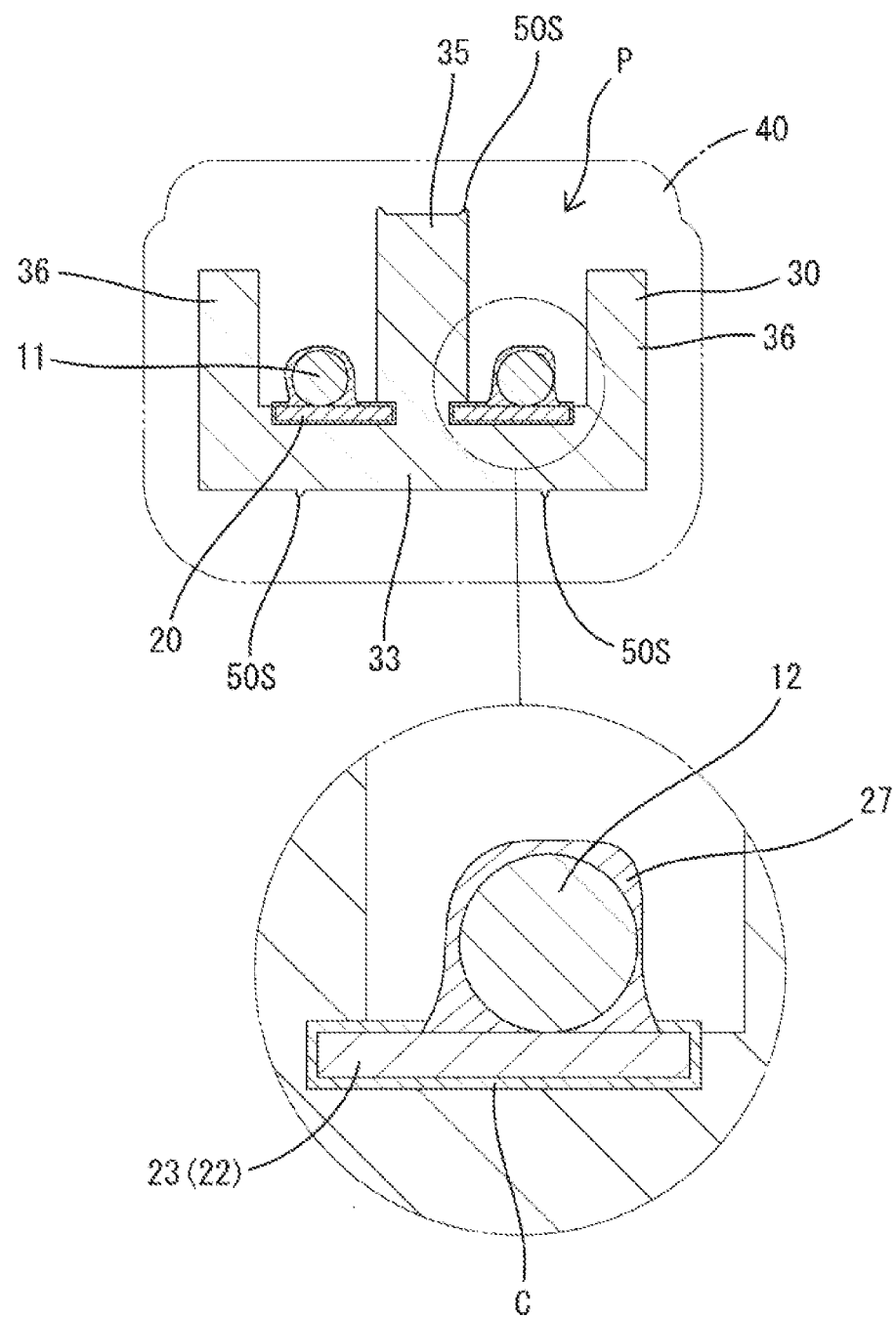
FIG. 17 is a cross-sectional view of the sensor showing a state where the wire is connected to the connection terminal, and a view corresponding to a cross-section taken along A-A in FIG. 11.

Similarly to Embodiment 1, a pair of connection terminals 22 are mounted on a capacitor 24. As shown in FIG. 16, the capacitor 24 is electrically connected to a pair of connection terminals 22 by a conductive paste 25 such as a silver paste. The capacitor 24 is sealed with a protective material 26 such as epoxy resin.

Similarly to Embodiment 1, a moisture-proofing agent is applied to the connection terminals 22. The moisture-proofing agent forms a coating layer C that covers the connection terminals 22. The coating layer C covers at least the sensor body 21 side of the connection terminals 22.

Figure 15:
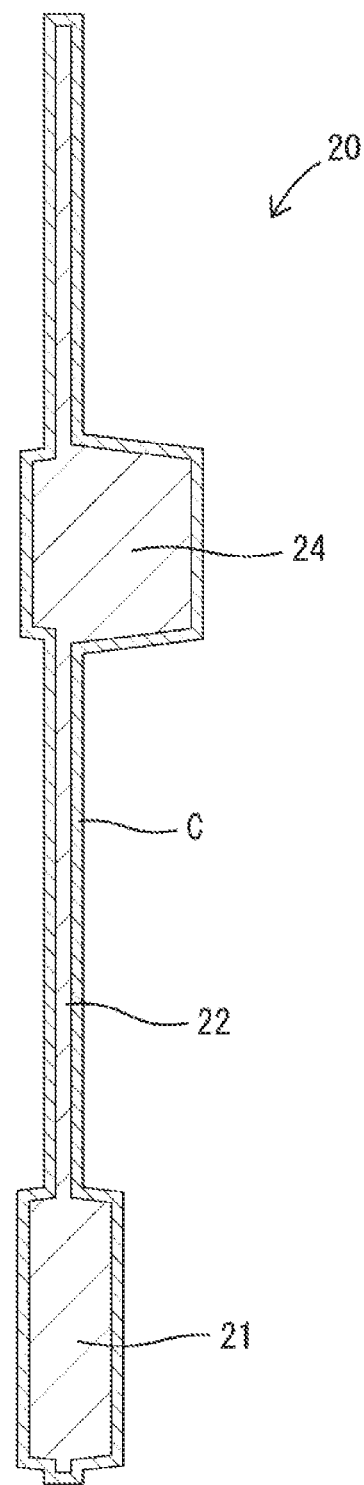
FIG. 15 is a cross-sectional view showing the sensor component in a state where a coating layer is formed thereon, and a view corresponding to a cross-section taken along C-C in FIG. 14.

The coating layer C adheres to the outer surface of the connection terminals 22 without a gap, and forms a transparent film. As shown in FIGS. 15 and 16, the coating layer C covers the whole of the upper, lower, the right and left side surfaces of the connection terminals 22, and the whole of the upper and lower surfaces, and front, rear, left, and right side surfaces of the capacitor 24 and the sensor body 21. In other words, the coating layer C uniformly covers the entire sensor part 20.

Next, an example of a method for manufacturing the wheel speed sensor S according to this embodiment will be described. Similarly to Embodiment 1, the method for manufacturing the wheel speed sensor S includes: a sensor component manufacturing step of manufacturing the sensor component P by holding the sensor part 20 with the holder part 30; a wire connecting step of connecting the wire 11 to the connection terminals 22 of the sensor component P; and a resin-sealing step of resin-sealing the sensor component P by the exterior part 40. The sensor component manufacturing step further includes: a coating step of forming the coating layer C on the sensor part 20; and a holding step of holding the sensor part 20 with the holder part 30.

Figure 14:
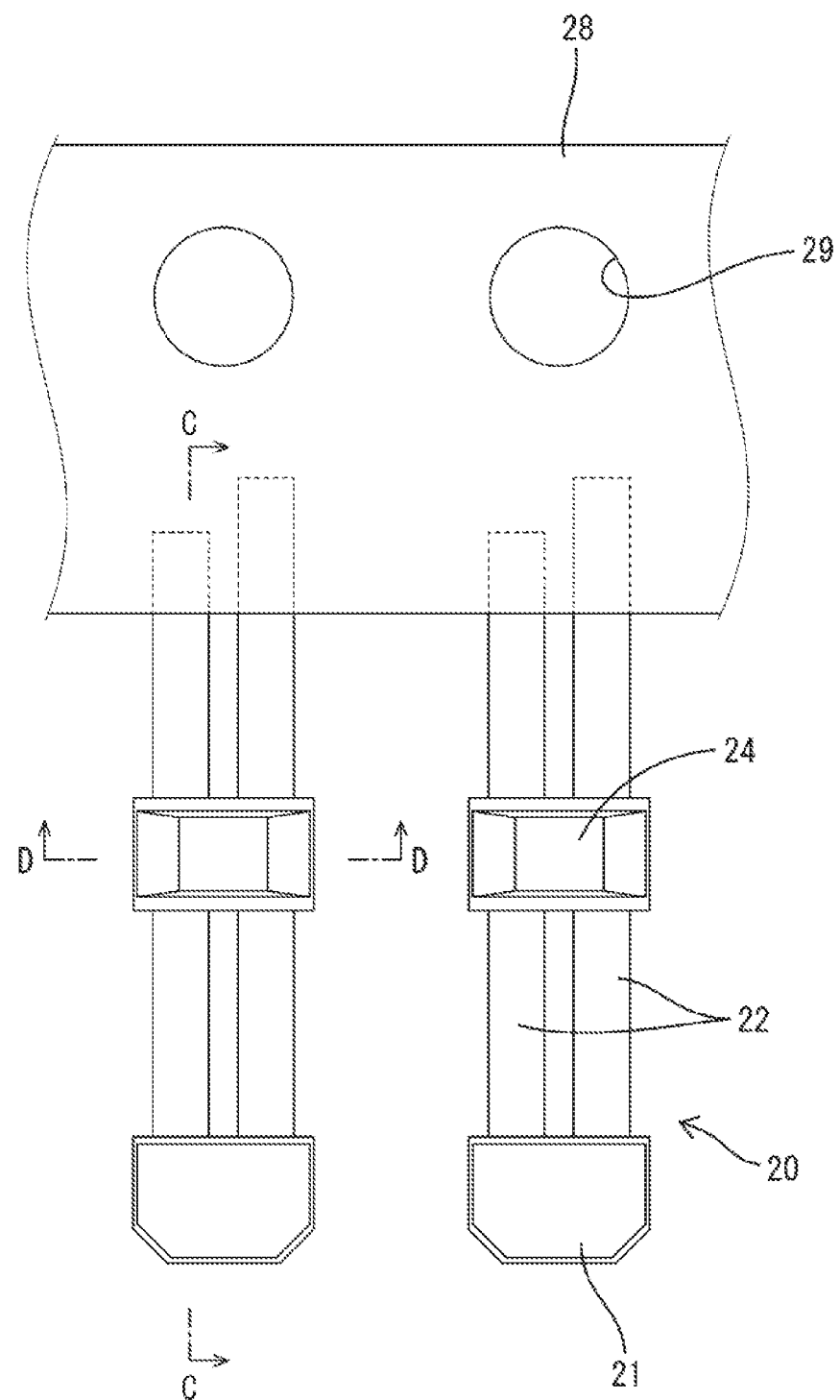
FIG. 14 is a diagram showing a process of coating a sensor part according to Embodiment 2.

In the sensor component manufacturing step, first, the coating step of forming the coating layer C on the sensor part 20 is performed. In the coating step, a preparation step is performed to ensure that a plurality of sensor parts 20 can be handled as a single piece. In the preparation step, as shown in FIG. 14, a large number of sensor parts 20 are arranged on and fixed to a band member 28. The large number of sensor parts 20 are arranged in the direction in which the connection terminals 22 extend orthogonally to the band member 28, and are attached at predetermined intervals in the longitudinal direction of the band member 28. The sensor parts 20 are fixed to the side edge portion of the band member 28 by, for example, using an adhesive tape or the like. The end portions of the connection part 23 side of the connection terminals 22 of the sensor parts 20 are fixed to the band member 28, and substantially the entire sensor parts 20 protrude from the band member 28. Note, that a plurality of hole portions 29 are arranged in a row in the longitudinal direction of the band member 28.

After the preparation step, the coating layer C is formed on (applied to) the sensor parts 20 by soaking the whole sensor parts 20 in coating solution. In a state where the sensor parts 20 are hanging downward from the band member 28, the portion up to the side edge portion of the band member 28 is soaked (i.e. dipped) in the coating solution. By doing this, the coating material can be applied to a large number of the sensor parts 20 at a time. After that, a drying step is performed by heating and drying the sensor parts 20 to which the coating material has been applied. Thus, the coating layer C is formed.

Next, a separation step of separating the sensor parts 20 from the band member 28 is performed. In the separation step, the end portions of the connection terminals 22 are cut off at a position along the side edge of the band member 28. At this time, by cutting off the large number of connection terminals 22 from the band member 28 at a time, the plurality of sensor parts 20 can be separated from the band member 28 at a time.

Next, the holding step of holding the sensor part 20 with the holder part 30 is performed. In the holding step, the sensor part 20 on which the coating layer C is formed is positioned and accommodated in the mold for primary molding, then a synthetic resin is injected into the mold and cured, thereby molding the holder part 30. Accordingly, a sensor component P in which the sensor part 20 is embedded in the holder part 30 in one piece is manufactured.

Next, similarly to Embodiment 1, the wire connecting step is performed. In the wire connecting step, the conductors 12 of the wires 11 of the wire harnesses 10 are connected to the connection terminals 22 of the sensor component P by the solder 27. The coating layer C is melted by the heat of the solder 27, so that each of the conductors 12 and the connection terminals 22 are brought in direct contact and connected to each other without interposing the coating layer C (see FIG. 17).

After that, similarly to Embodiment 1, the resin-sealing step is performed. Similarly to Embodiment 1, in the resin-sealing step, the melt part 50 is melted and adhered to the exterior part 40.

It should be noted that by performing the coating step prior to the holding step, the coating layer C can be prevented from being formed on the outer surface of the holder part 30, and the adherence between the holder part 30 and the exterior part 40 can be prevented from being deteriorated. Additionally, a positioning recess (not shown) provided in the holder part 30 for positioning the sensor component P in the mold for secondary molding can be prevented from being filled with the coating layer C.

In the above-described embodiment, similarly to Embodiment 1, the melt part 50 is provided on the outer surface of the holder part 30. Accordingly, moisture that reaches the holder part 30 via the conductors 12 of the wires 11 can be prevented from penetrating toward the sensor body 21.

Moreover, the sensor component P according to this embodiment is provided with the water-proofing coating layer C that is formed to cover the sensor body 21 side of the connection terminals 22, and even if moisture reaches the connection terminals 22, the moisture will not come in direct contact with the part covered with the coating layer C in the connection terminals 22. In other words, moisture does not penetrate to the sensor body 21 side of the connection terminals 22, and thus moisture does not reach the part in which ion migration is likely to occur. In this embodiment, if the conductive paste 25 connected to the capacitor 24 is a silver paste, ion migration is likely to occur in a portion where the connection terminals 22 are connected to the capacitor 24. Additionally, in the portion, of the connection terminals 22, that is arranged in the recess 31, the upper surfaces of the adjacent connection terminals 22 are exposed without being covered with the holder part 30, and the upper surfaces of the connection terminals 22 and the upper surface of the holder part 30 are arranged to be flush to each other. In this portion, ion migration is more likely to occur compared with a portion in which the whole part of the connection terminals 22 including the upper surfaces is separately covered with the holder part 30. With the sensor component P according to this embodiment, since moisture does not stick to the portions of the connection terminals 22 such as a portion arranged in the recess 31, a portion at which the connection terminals 22 are connected to the capacitor 24, ion migration can be prevented from occurring. Accordingly, a short circuit between the connection terminals 22 can be prevented.

Moreover, in the coating step of forming the coating layer C on the connection terminals 22, the coating layer C is formed by soaking the whole sensor parts 20 in the coating solution. According to this method, the coating layer C can be formed easily, and thus the workability of the coating step can be improved.

Other Embodiments

The present disclosure is not limited to the embodiments illustrated in the above description with reference to the drawings, and for example, the following embodiments are also included in the technical scope of the present disclosure.

Figure 18:
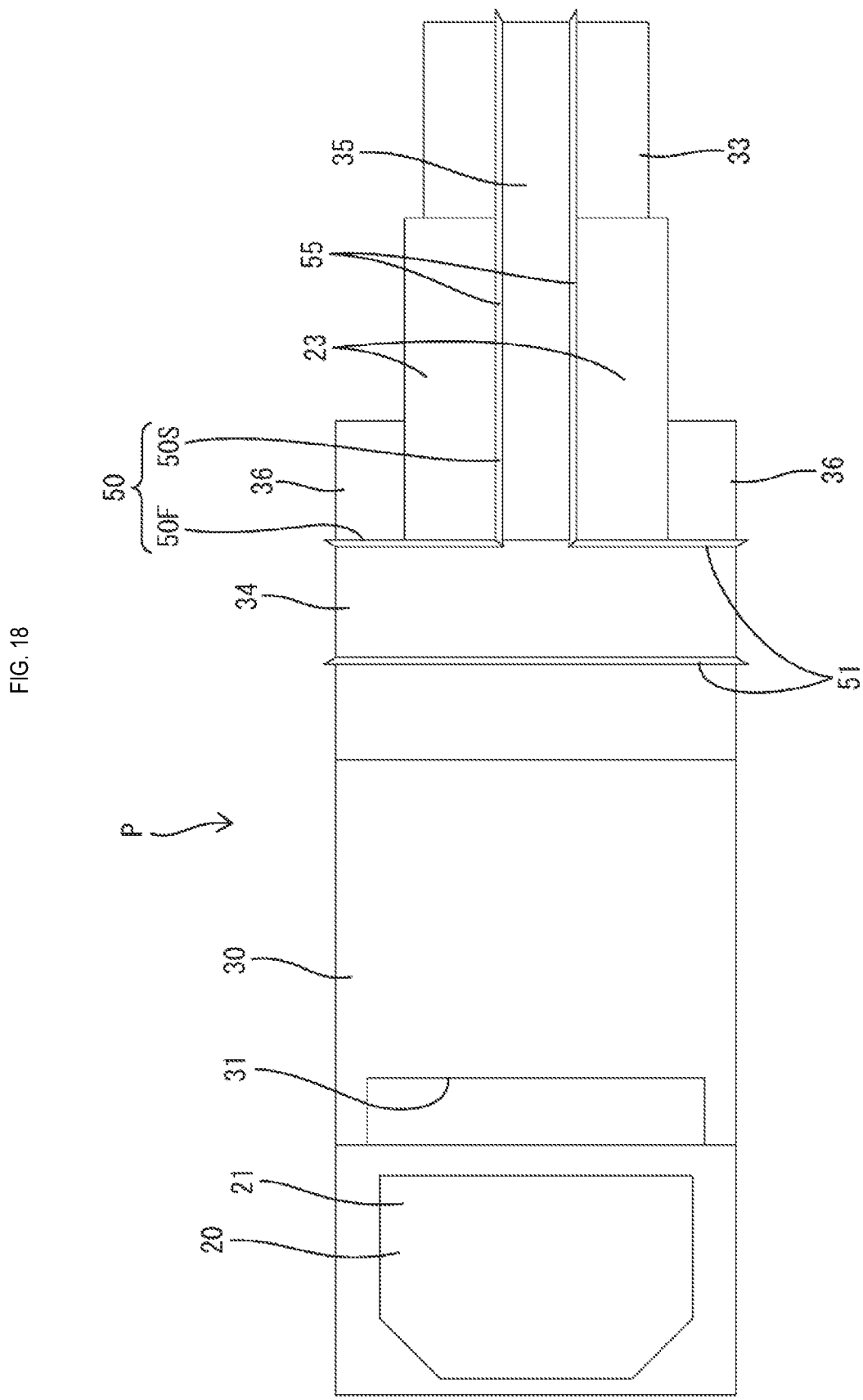
FIG. 18 is a plan view showing a sensor component of another Embodiment (1).
Figure 19:
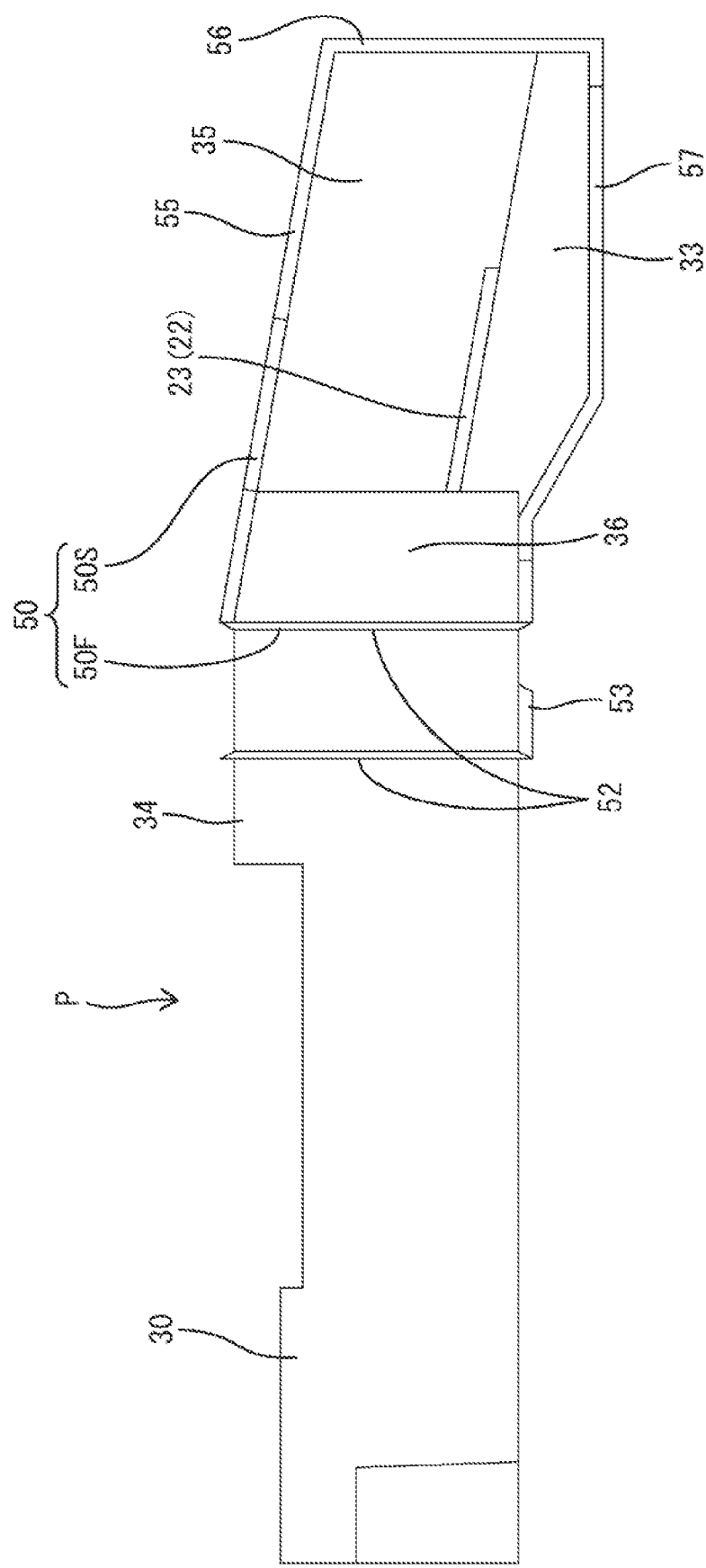
FIG. 19 is a side view showing the sensor component.

In the above-described embodiments, the position at which the melt part 50 is formed was illustrated specifically. However, the position at which the melt part is formed may also be different from the above-described embodiments. Specifically, for example, as shown in FIGS. 18 to 20, the melt part 50 may be formed such that the first upper surface melt part 51 on the rear side extends along the rear end edge of the first partition wall 34, or the second lower surface melt part 57 extends along the left and right end edges of the placement part 33.

In the above-described embodiments, the sensor component P is formed by insert-molding the holder part 30 with the sensor part 20 serving as the insert. However, there is no limitation to this, and the sensor component may also be formed by attaching the sensor part to a holder part that is manufactured separately, to form one piece.

In the above-described embodiments, the bracket 43 and the exterior part 40 are formed in one piece in the resin-sealing step. However, there is no limitation to this, and for example, the exterior part may also be formed in one piece with the bracket by inserting the molded exterior part into the insertion hole of the bracket after the resin-sealing step, or both the exterior part and the bracket may be molded in the resin-sealing step.

In the above-described embodiments, the moisture-proofing agent is applied to the connection terminals 22. However, the moisture-proofing agent need not necessarily be applied.

In the above-described embodiments, a case in which the sensor is a wheel speed sensor S was described. However, there is no limitation to this, and the present disclosure can be applied to various kinds of sensors.

In the above-described embodiments, the melt part 50 includes the first melt part 50F and the second melt part 50S, however the second melt part need not necessarily be included.

In the above-described embodiments, the melt part 50 is formed double, however the melt part need not necessarily be formed double, and may also be formed single or triple or more.

In the above-described Embodiment 2, the coating layer C is formed on the whole of the sensor part 20, however there is no limitation to this. The coating layer may be formed at least only on the portion of the sensor part in which ion migration is likely to occur.

In the above-described Embodiment 2, the recess 31 and the connection part at which the connection terminal 22 and the capacitor 24 are connected were listed as examples of the portion in which ion migration is likely to occur. However, there is no limitation to this, and if the portion in which ion migration is likely to occur is different from the above-described embodiment due to the configuration of the sensor part being different from the above-described embodiment, the portion on which the coating layer is to be formed may also be different from the above-described embodiment.

In the above-described Embodiment 2, applying the coating material to the sensor part 20 through dipping was illustrated, however, there is no limitation to this, and the method for applying the coating material to the sensor part 20 may be performed with any known method such as spray coating method or brush coating method.

The invention claimed is:

1. A sensor component comprising:
    a sensor part having a sensor body and a connection terminal extending from the sensor body in a first direction defined by a length of the sensor body, the connection terminal including a pair of connection parts disposed on a distal end of the connection terminal;
    a holder part for holding the sensor part, the holder part including a partition wall separating the pair of connection parts, and
    a first rib extending in the first direction on an outer surface of the partition wall,
    wherein the connection terminal being resin-sealed by an exterior part in a state in which the connection terminal is connected to a conductor of a wire,
    wherein the first rib is configured to melt during the molding of the exterior part so as to adhere to the exterior part.

2. The sensor component according to claim 1, wherein the first rib is pointed.

3. The sensor component according to claim 2, wherein a moisture-proofing agent is applied to the connection terminal.

4. A sensor comprising:
    the sensor component according to claim 2; and
    the exterior part that resin-seals the sensor component,
    wherein the first rib is configured to be melted and adhered to the exterior part.

5. The sensor component according to claim 1, wherein a moisture-proofing agent is applied to the connection terminal.

6. A sensor comprising:
    the sensor component according to claim 5; and
    the exterior part that resin-seals the sensor component,
    wherein the rib is configured to be melted and adhered to the exterior part.

7. A sensor comprising:
    the sensor component according to claim 1; and
    the exterior part that resin-seals the sensor component,
    wherein the first rib is configured to be melted and adhered to an exterior front portion of the exterior part.

8. A method for manufacturing the sensor according to claim 7, the method comprising:
    manufacturing the sensor component by holding the sensor part with the holder part;
    connecting the wire to the connection terminal of the sensor component; and
    melting the first rib so as to resin seal the sensor component by to the exterior part.

9. The sensor component according to claim 1, wherein the rib includes a second rib, the second rib extending in a second direction perpendicular to the first direction.

* * * * *